(12) United States Patent
Okada

(10) Patent No.: US 10,412,336 B2
(45) Date of Patent: Sep. 10, 2019

(54) VIDEO SIGNAL PROCESSING APPARATUS, VIDEO SIGNAL PROCESSING METHOD, AND PROGRAM FOR VIDEO SIGNAL CORRECTION

(71) Applicant: Sony Corporation, Tokyo (JP)

(72) Inventor: Sohhei Okada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/761,479

(22) PCT Filed: Aug. 30, 2016

(86) PCT No.: PCT/JP2016/003957
§ 371 (c)(1),
(2) Date: Mar. 20, 2018

(87) PCT Pub. No.: WO2017/064829
PCT Pub. Date: Apr. 20, 2017

(65) Prior Publication Data
US 2018/0262710 A1    Sep. 13, 2018

(30) Foreign Application Priority Data
Oct. 15, 2015 (JP) ................................ 2015-203660

(51) Int. Cl.
*H04N 5/57* (2006.01)
*H04N 5/243* (2006.01)
(Continued)

(52) U.S. Cl.
CPC .............. *H04N 5/57* (2013.01); *G06T 5/009* (2013.01); *G06T 5/50* (2013.01); *H04N 5/144* (2013.01);
(Continued)

(58) Field of Classification Search
CPC . G06T 2207/20182; G06T 2207/20201; G06T 2207/20224; G06T 5/003;
(Continued)

(56) References Cited

U.S. PATENT DOCUMENTS

| | | | | |
|---|---|---|---|---|
| 2010/0013953 A1* | 1/2010 | Niikura | ................ | H04N 5/2353 348/226.1 |
| 2010/0053369 A1* | 3/2010 | Nagai | .................... | H04N 5/235 348/226.1 |

(Continued)

FOREIGN PATENT DOCUMENTS

| | | |
|---|---|---|
| JP | 2009-135792 A | 6/2009 |
| WO | WO 2015/119207 A1 | 8/2015 |

OTHER PUBLICATIONS

International Search Report dated Nov. 15, 2016 in PCT/JP2016/003957, 1 page.

*Primary Examiner* — Amy R Hsu
(74) *Attorney, Agent, or Firm* — Oblon, McClelland, Maier & Neustadt, L.L.P.

(57) ABSTRACT

This video signal processing apparatus includes a luminance correction circuit that multiplies video signals of M sequential frames by weight coefficients individually set for frames respectively ordered in the M frames, M being plural, and adds and averages results, to generate a correction video signal of a frame in a predetermined order in the M frames, a value of a weight coefficient set for the frame in the predetermined order being set to be maximum among values of the weight coefficients individually set for the frames respectively ordered in the M frames.

7 Claims, 7 Drawing Sheets

(51) Int. Cl.
*H04N 5/14* (2006.01)
*G06T 5/50* (2006.01)
*H04N 5/232* (2006.01)
*H04N 5/235* (2006.01)
*G06T 5/00* (2006.01)

(52) U.S. Cl.
CPC ....... *H04N 5/2357* (2013.01); *H04N 5/23254* (2013.01); *H04N 5/23293* (2013.01); *H04N 5/243* (2013.01); *G06T 2207/10016* (2013.01); *G06T 2207/10024* (2013.01)

(58) Field of Classification Search
CPC .. G06T 5/50; H04N 5/23258; H04N 5/23267; H04N 5/911; H04N 7/0132
See application file for complete search history.

(56) References Cited

U.S. PATENT DOCUMENTS

| | | | |
|---|---|---|---|
| 2010/0303374 A1* | 12/2010 | Mizuno | G06T 3/4053 382/260 |
| 2011/0292240 A1* | 12/2011 | Sekiguchi | H04N 5/2357 348/226.1 |
| 2016/0006978 A1* | 1/2016 | Satoh | H04N 5/23267 386/269 |
| 2016/0249003 A1* | 8/2016 | Miwa | H04N 5/2351 |
| 2016/0366353 A1* | 12/2016 | Kobayashi | H04N 5/361 |
| 2017/0366731 A1* | 12/2017 | Onodera | H04N 5/357 |

* cited by examiner

| ACM TYPE | Weight coefficient | | | | |
|---|---|---|---|---|---|
| | Reference frame | Frame (-1F) | Frame (-2F) | Frame (-3F) | Frame (-4F) |
| 1 | 2 | 1 | 0 | 0 | 0 |
| 2 | 3 | 2 | 1 | 0 | 0 |
| 3 | 4 | 3 | 2 | 1 | 0 |

FIG.4

```
< FLICKER  REDUCTION >

REDUCTION                    :  ON
  POWER  LINE  FREQUENCY       :  50Hz
  FLAME RATE                   :  400fps
  MODE
    ACM  TYPE                  :  1
```

FIG.5

VIDEO SIGNAL PROCESSING APPARATUS, VIDEO SIGNAL PROCESSING METHOD, AND PROGRAM FOR VIDEO SIGNAL CORRECTION

TECHNICAL FIELD

The present technology relates to a video signal processing apparatus, a video signal processing method, and a program that suppress a luminance change component of a video signal, the video signal being input with a temporal change in luminance.

BACKGROUND ART

An image sensor accumulates electric charge at a different timing on a surface basis or on a line basis. In general, a system of matching the timings to accumulate electric charge on a surface basis is referred to as a global shutter system, and a system of matching the timings to accumulate electric charge on a line basis is referred to as a rolling shutter system. In the image sensors, a CCD image sensor employing the global shutter system has prevailed in the past, but a CMOS image sensor has recently attracted attention, the CMOS image sensor having less power consumption than the CCD image sensor and capable of being produced with a small number of parts and at low cost. This CMOS image sensor often employs the rolling shutter system in terms of structural issues. In both of the systems, when imaging is performed with a light source repeatedly blinking, due to a difference in electric charge accumulation timings of sensors, a light-dark difference (surface flicker) on the entire surface or a light-dark difference for each of lines (line flicker) appears.

For a flicker correction technique, there is known a method of adding and averaging video signals of M sequential frames to thereby obtain a flicker-corrected image (see Patent Literature 1). In this Patent Literature 1, the frame rate is divided by a light-source frequency (power-supply frequency×2), a resultant value is rounded, and a resultant integer is set as the number of frames as addition targets, M. Thus, those M frames are added and averaged.

CITATION LIST

Patent Literature

Patent Literature 1: Japanese Patent Application Laid-open No. 2009-135792

DISCLOSURE OF INVENTION

Technical Problem

However, in the technique of suppressing a luminance change component in a video signal transmitted with a temporal change in luminance, such as the flicker correction described above, many problems to be solved still remain.

In view of the circumstances as described above, it is an object of the present technology to provide a video signal processing apparatus, a video signal processing method, and a program that are capable of solving various problems involved in signal processing of suppressing a luminance change component in a video signal transmitted with a temporal change in luminance.

Solution to Problem

In order to solve the problems described above, a video signal processing apparatus according to an embodiment of the present technology includes a luminance correction circuit that multiplies video signals of M sequential frames by weight coefficients individually set for frames respectively ordered in the M frames, M being plural, and adds and averages results, to generate a correction video signal of a frame in a predetermined order in the M frames, a value of a weight coefficient set for the frame in the predetermined order being maximum among values of the weight coefficients individually set for the frames respectively ordered in the M frames.

In the video signal processing apparatus according to the embodiment of the present technology, for a plurality of frames having different distances from the frame in the predetermined order among (M−1) frames other than the frame in the predetermined order, a value of a weight coefficient set for a frame having the distance relatively long may be set to be equal to or smaller than a value of a weight coefficient set for a frame having the distance relatively short.

The M may be a value preset by dividing a frame rate by a light-source frequency of an imaging environment, rounding a resultant value, and setting a resultant integer as an upper limit.

The video signal processing apparatus according to the embodiment of the present technology may further include: a memory that stores a plurality of types of weight coefficient sets, each of the weight coefficient sets including values of M weight coefficients individually associated with the frames respectively ordered in the M frames; an operation input unit that receives, from a user, a selection of one weight coefficient set from the plurality of types of weight coefficient sets stored in the memory; and a control unit that sets, in the luminance correction circuit, the values of the M weight coefficients of the weight coefficient set selected by the user with the operation input unit.

The video signal processing apparatus according to the embodiment of the present technology may further include a display data generation unit that generates display data for causing a screen of a display unit to regularly display pieces of specifying information in descending order or ascending order of correction intensity, the pieces of specifying information specifying the plurality of types of weight coefficient sets stored in the memory.

The video signal processing apparatus according to the embodiment of the present technology may further include: a motion detection circuit that detects a motion of a video signal as a correction target; and a weight-coefficient adjustment circuit that adjusts the values of the weight coefficients individually set for the frames respectively ordered, on the basis of speed information of the detected motion.

A video signal processing method according to another embodiment of the present technology includes multiplying video signals of M sequential frames by weight coefficients individually set for frames respectively ordered in the M frames, M being plural, and adding and averaging results, to generate a correction video signal of a frame in a predetermined order in the M frames, a value of a weight coefficient set for the frame in the predetermined order being maximum among values of the weight coefficients individually set for the frames respectively ordered in the M frames.

A program according to another embodiment of the present technology is a program causing a computer to function as a luminance correction circuit that multiplies video signals of M sequential frames by weight coefficients individually set for frames respectively ordered in the M frames, M being plural, and adds and averages results, to generate a correction video signal of a frame in a predetermined order in the M frames, a value of a weight coefficient set for the frame in the predetermined order being maximum among values of the weight coefficients individually set for the frames respectively ordered in the M frames.

Advantageous Effects of Invention

As described above, according to the present technology, it is possible to solve various problems involved in signal processing of suppressing a luminance change component in a video signal transmitted with a temporal change in luminance.

BRIEF DESCRIPTION OF DRAWINGS

FIG. 4 is a diagram showing an example of a plurality of weight coefficient sets.

FIG. 5 is a diagram showing an example of a flicker correction condition setting screen.

MODE(S) FOR CARRYING OUT THE INVENTION

Hereinafter, an embodiment according to the present technology will be described with reference to the drawings.

First Embodiment

Figure 1:
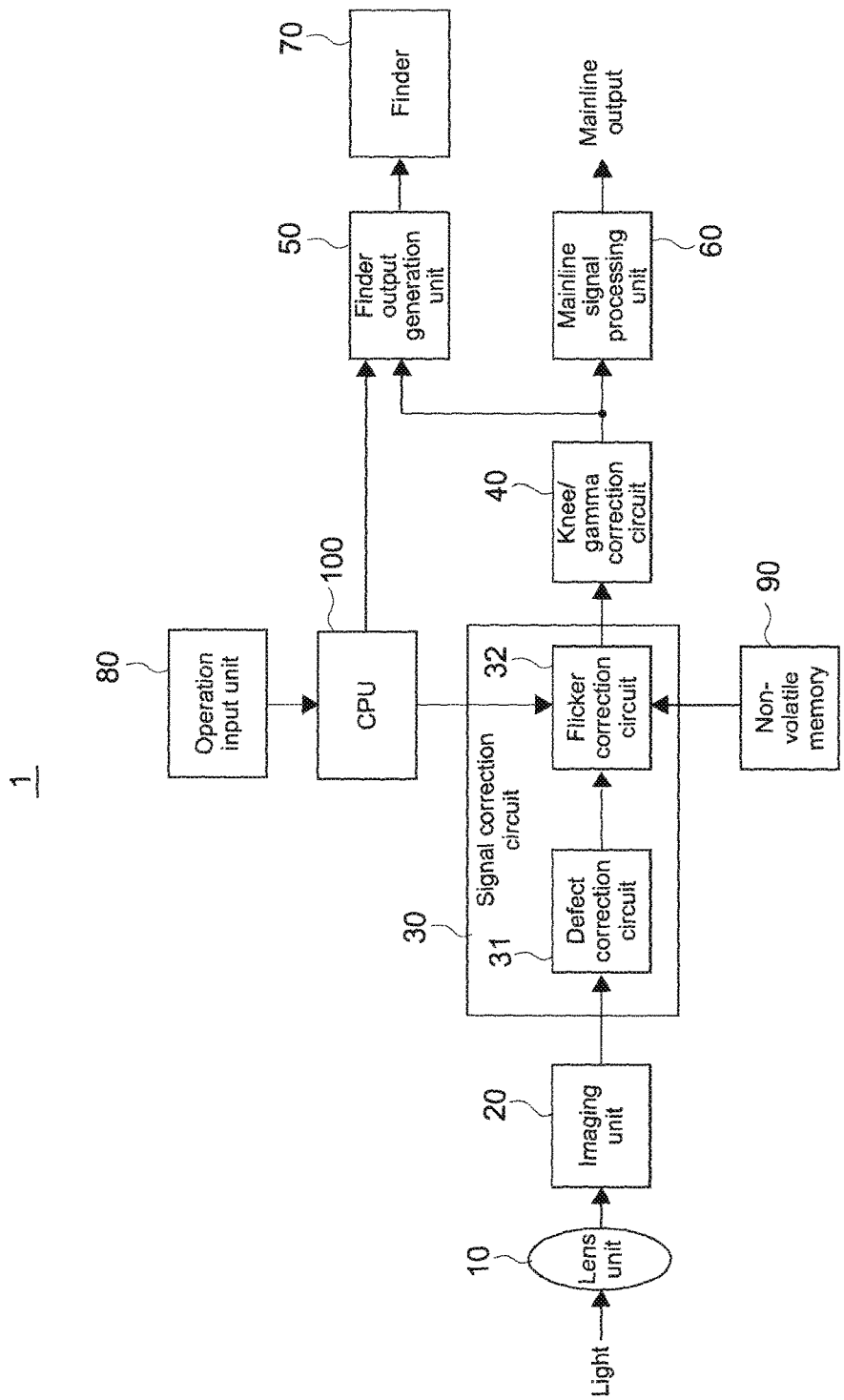
FIG. 1 is a block diagram showing a configuration of an imaging apparatus 1 as a first embodiment of a video processing apparatus according to the present technology.

FIG. 1 is a block diagram showing a configuration of an imaging apparatus 1 as a first embodiment of a video signal processing apparatus according to the present technology.

As shown in the figure, this imaging apparatus 1 includes a lens unit 10, an imaging unit 20, a signal correction circuit 30, a knee/gamma correction circuit 40, a finder output generation unit 50, a mainline signal processing unit 60, a finder 70, an operation input unit 80, a non-volatile memory 90, and a CPU (Central Processing Unit) 100.

The lens unit 10 includes a lens for imaging or a plurality of lenses in combination. The lens unit 10 condenses light from a subject and forms an image on an imaging surface of the imaging unit 20.

The imaging unit 20 includes, for example, an imaging device such as a CMOS (Complementary Metal Oxide Semiconductor) image sensor or a CCD (Charge Coupled Device), which has an imaging surface on which pixels are arranged in a matrix. The imaging unit 20 receives light from the subject on the imaging surface, the light being incident via the lens unit 10, photoelectrically converts the light on a pixel-to-pixel basis, and supplies a resultant video signal to the signal correction circuit 30.

The signal correction circuit 30 performs various types of correction on the video signal generated in the imaging unit 20. The signal correction circuit 30 includes a defect correction circuit 31 and a flicker correction circuit 32 (luminance correction circuit). The defect correction circuit 31 detects a video signal corresponding to a position of a defective pixel in the imaging unit 20 and corrects that video signal. It should be noted that in the present technology the defect correction circuit 31 is not necessarily required. The flicker correction circuit 32 eliminates flicker, which occurs in a video signal resulting from a difference between a power-supply frequency and a frame rate. The signal correction circuit 30 supplies the corrected video signal to the knee/gamma correction circuit 40.

The knee/gamma correction circuit 40 performs knee correction and gamma correction on the video signal supplied from the signal correction circuit 30 and supplies a result thereof to the finder output generation unit 50 and the mainline signal processing unit 60.

The finder output generation unit 50 converts the video signal supplied from the knee/gamma correction circuit 40 into a video signal for finder display and outputs the converted video signal for finder display to the finder 70. Further, the finder output generation unit 50 (display data generation unit) can generate display data of a GUI (Graphical User Interface) for receiving inputs of various types of information from a user with the operation input unit 80, and output the display data to the finder 70, a monitor, a monitor of a personal computer externally connected, or the like.

The finder 70 displays a video during imaging or a video by reproducing video data stored in storage. Further, the finder 70 can display the display data of a GUI generated by the finder output generation unit 50.

The mainline signal processing unit 60 performs processing such as compression coding and error correction coding on the video signal supplied from the knee/gamma correction circuit 40, to store a resultant video signal in storage not shown in the figure or to transmit a resultant video signal to an external apparatus via a transmission cable.

The operation input unit 80 receives, for example, an input of setting information such as various imaging conditions from a user.

The non-volatile memory 90 (that corresponds to a "memory" in the Claim) is, for example, a memory storing a plurality of weight coefficient sets or the like used in the flicker correction circuit 32.

The CPU 100 (that corresponds to a "control circuit" in the Claim) is a control circuit that performs the overall control on the imaging apparatus 1.

Figure 2:
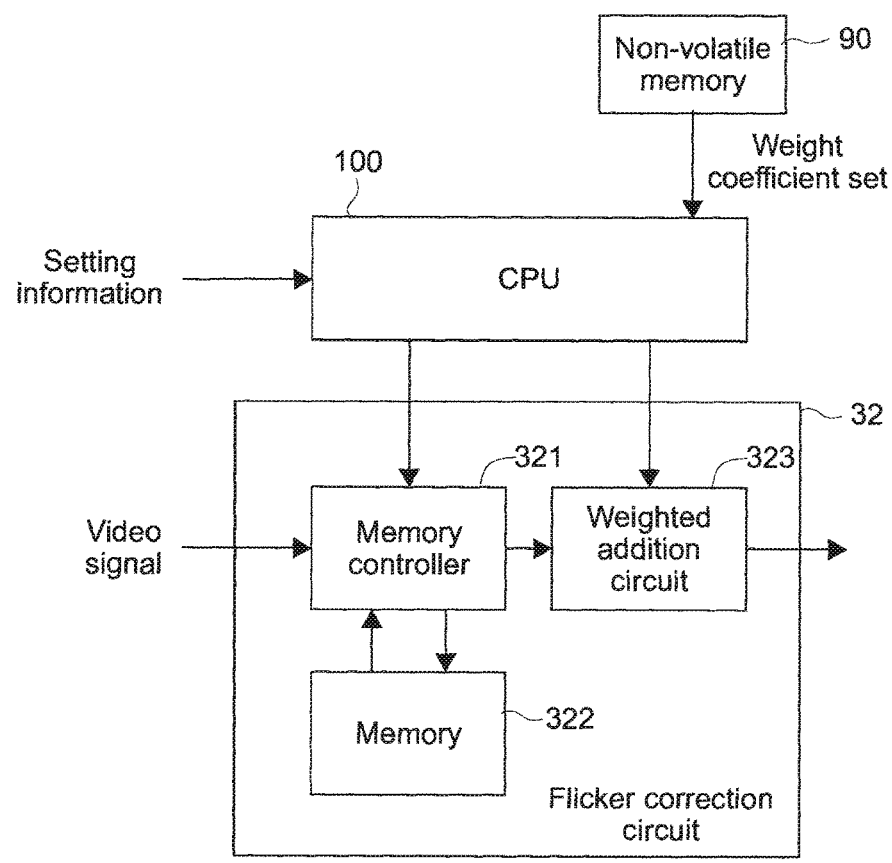
FIG. 2 is a block diagram showing a configuration of a flicker correction circuit 32 in the imaging apparatus 1 of FIG. 1.

FIG. 2 is a block diagram showing a configuration of the flicker correction circuit 32 in the signal correction circuit 30.

The flicker correction circuit 32 includes a memory controller 321, a memory 322, and a weighted addition circuit 323. The flicker correction circuit 32 performs flicker correction on a video signal on the basis of flicker correction conditions given by the CPU 100 in the following manner.

For example, the CPU 100 sets various correction conditions and the like of the signal correction circuit 30 according to various types of setting information input by a user with the operation input unit 80 provided to the imaging apparatus 1. The user can input setting information regarding flicker correction, as one type of the setting information. The setting information regarding flicker correction includes a power-supply frequency, a frame rate, and ACCUMULA- TION TYPE (hereinafter referred to as "ACM TYPE") that specifies a flicker correction mode.

Here, the setting information regarding flicker correction will be described.

The power-supply frequency has options, for example, 50 Hz and 60 Hz. The user only needs to select a set value of the power-supply frequency according to a commercial power-supply frequency supplied to an area where the imaging apparatus 1 is used.

The frame rate has options, for example, 400 fps and 480 fps. When the frame rate is lower than the twice of the power-supply frequency, i.e., a light-emitting frequency of a fluorescent tube, a shutter is driven at the light-emitting frequency of the fluorescent tube, so that flicker can be eliminated. However, when the frame rate is higher than the twice of the power-supply frequency (a light-emitting frequency of a fluorescent tube), e.g., 400 fps or 480 fps, it is impossible to eliminate flicker by the shutter. In this regard, it is necessary to perform flicker correction by the signal processing of the flicker correction circuit 32.

The ACM TYPE is information for specifying a set of weight coefficients given to respective M frames that are weighted addition targets for the flicker correction of the weighted addition circuit 323.

The CPU 100 determines a weight coefficient set on the basis of the setting information, the setting information being input by the user through the operation of the operation input unit 80, and sets the weight coefficients in the weighted addition circuit 323.

Further, the CPU 100 sets in the memory controller 321 the number of frames to be stored in the memory 322 on the basis of the setting information input by the user through the operation of the operation input unit 80.

Under the control of the CPU 100, the memory controller 321 stores a video signal in the memory 322, the video signal being corrected by a correction circuit at a prior stage within the signal correction circuit 30. When the video signals of the set M frames are stored in the memory 322, the memory controller 321 reads the video signals of the M frames from the memory 322 and supplies those video signals to the weighted addition circuit 323.

The memory 322 is a storage area in which video signals corresponding to at least M frames are stored, the video signals being corrected by a correction circuit at a prior stage within the signal correction circuit 30. The memory 322 stores video signals corresponding to at least M frames that are constantly newly input. The number of frames stored in the memory 322 may be larger than M.

The weighted addition circuit 323 is a circuit that inputs the video signals of the M frames, the video signals being read from the memory 322 by the memory controller 321 and sequentially supplied, and executes weighted addition and averaging using the weight coefficients that are set for those video signals of the frames by the CPU 100, to generate a flicker-corrected video.

(Typical First Addition-Type Flicker Correction Method and Issue Thereof)

Here, a typical first addition-type flicker correction method and an issue thereof will be described.

Used in the typical addition-type flicker correction method is an adder circuit that adds video signals of M sequential frames for each pixel, averages the video signals, and generates a flicker-corrected video.

This adder circuit calculates the number of frames as addition targets, M, from the following expression.

$$M = LCM(\text{power-supply frequency} \times 2, \text{frame rate}) / (\text{power-supply frequency} \times 2)$$

Here, the LCM (Element 1, Element 2) is the least common multiple of Element 1 and Element 2. For example, when the frame rate is set to "480" with respect to the power-supply frequency of 50 Hz, M is "24".

The adder circuit adds values of the video signals of the M frames for each corresponding pixel (at the same position), divides a result of the addition by the value of M, to obtain an averaged value as a flicker-corrected video.

According to this typical addition-type flicker correction method, a flicker-corrected video from which flicker is completely eliminated is obtained. However, when an image of a subject moving at high speed (dynamic body image) is included in a group of frames as addition targets, unnaturally large motion blur occurs as a result of the addition and averaging of video components of the dynamic body image in the M frames at the maximum, i.e., 24 frames at the maximum in the above example. Therefore, there is a possibility that a feeling of strangeness is given to a viewer of the moving image.

(Typical Second Addition-Type Flicker Correction Method and Issue Thereof)

In a typical second addition-type flicker correction method, a frame rate is divided by a light-source frequency (the power-supply frequency×2), a resultant value is rounded, and a resultant integer is set as the number of frames as addition targets, M. For example, when an adder circuit sets the frame rate to "400" with respect to the power-supply frequency of 50 Hz, the value of M is "4". Further, when the adder circuit sets the frame rate to "480" with respect to the power-supply frequency of 50 Hz, the value of M is "5" by rounding processing.

In this second addition-type flicker correction method, flicker cannot be completely eliminated, but the amount of motion blur can be made smaller than in the typical first addition-type flicker correction method described above, so that a feeling of strangeness due to the large motion blur can be reduced.

However, by this typical second addition-type flicker correction method as well, the degree of blur in the entire dynamic body image is prone to be uniform as long as a result of the addition and averaging of the video signals of the plurality of frames is obtained as a flicker-corrected video. Again, unnaturalness in the appearance remains.

(Weighted-Addition-Type Flicker Correction Method of this Embodiment)

In a weighted-addition-type flicker correction method employed in the imaging apparatus 1 of this embodiment, the video signals of the M sequential frames, as weighted addition targets, are multiplied by weight coefficients individually set for the frames respectively ordered in the M frames, results thus obtained are added and averaged, and a result thus obtained is set as a flicker correction result for the video signal of a reference frame in the M frames.

Here, the reference frame is, for example, a frame in a predetermined order among the M frames sequentially supplied to the flicker correction circuit 32, e.g., a frame supplied last. When a frame supplied last is set as a reference frame, the M sequential frames, as weighted addition targets, refer to this reference frame and the (M−1) frames sequentially supplied to the flicker correction circuit 32 prior to the reference frame. It should be noted that the present technology is not limited to the above.

The value of "M" is an integer of 2 or more, which is set by dividing the frame rate by a light-source frequency (the power-supply frequency×2), rounding the resultant value, and setting the resultant integer as the upper limit.

Figure 3:
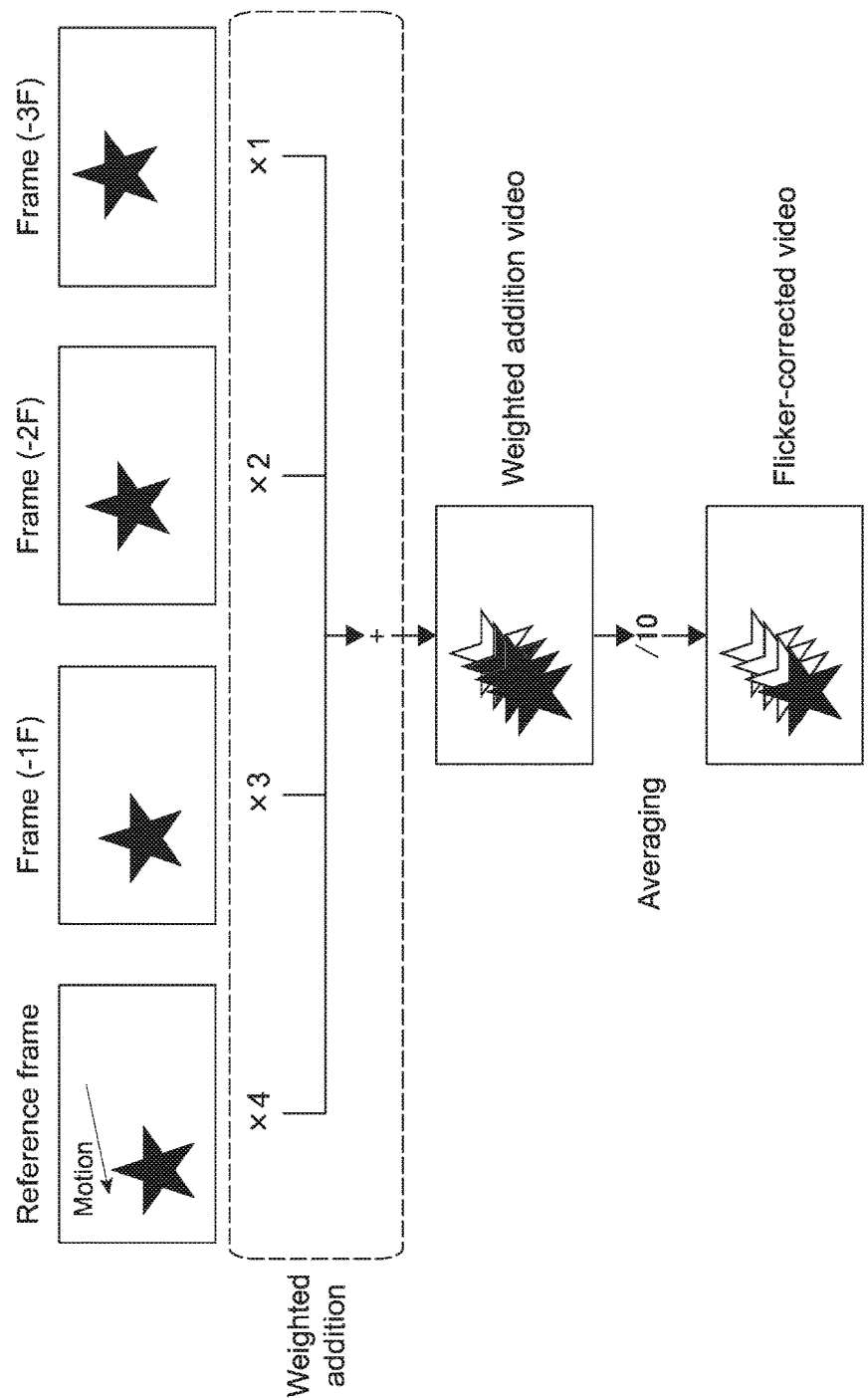
FIG. 3 is a diagram showing a specific example of weighted-addition-type flicker correction by the imaging apparatus 1 of this embodiment.

FIG. 3 is a diagram showing a specific example of the weighted-addition-type flicker correction by the imaging apparatus 1 of this embodiment. Here, for easy understanding, a state where an arbitrary shutter is released is shown, but whether the shutter is released or not has no relation with the present technology.

It is assumed that the number of frames as weighted addition targets, M, is "4", and the values of the weight coefficients individually set in advance for the frames respectively ordered in the M sequential frames are "4", "3", "2", and "1" from the reference frame side. Those values of the weight coefficients may be manually input in advance by a user with the operation input unit 80 or may be stored in advance in the non-volatile memory 90.

It should be noted that a gathering of the values of a plurality of weight coefficients, which can be associated with the frames respectively ordered in the M sequential frames as described above, will be hereinafter referred to as a "weight coefficient set".

Under the above conditions, the weighted addition circuit 323 operates as follows.

First, the weighted addition circuit 323 multiplies the video signal of the reference frame by the weight coefficient "4" and generates a weighted video signal of the reference frame.

The weighted addition circuit 323 multiplies the video signal of a frame (−1F), which is input immediately before the reference frame, by the weight coefficient "3" and generates a weighted video signal of the frame (−1F).

The weighted addition circuit 323 multiplies the video signal of a frame (−2F), which is input immediately before the frame (−1F), by the weight coefficient "2" and generates a weighted video signal of the frame (−2F).

The weighted addition circuit 323 multiplies the video signal of a frame (−3F), which is input immediately before the frame (−2F), by the weight coefficient "1" and generates a weighted video signal of the frame (−3F).

Next, the weighted addition circuit 323 adds values of the weighted video signal of the reference frame, the weighted video signal of the frame (−1F), the weighted video signal of the frame (−2F), and the weighted video signal of the frame (−3F) for each corresponding pixel (at the same position), and generates a weighted addition video signal corresponding to the M frames.

Next, the weighted addition circuit 323 divides the weighted addition video signal corresponding to the M frames by the sum of the weight coefficients of the weight coefficient set. A result thus obtained becomes a flicker-corrected video for the video signal of the reference frame.

The flicker correction is performed by such a weighted-addition-type flicker correction method, and thus it is possible to prevent the degree of blur of the entire dynamic body image in the flicker-corrected video from being prone to be uniform, and motion blur with more natural appearance can be obtained.

Further, among the values of the weight coefficients individually set for the frames respectively ordered in the M frames, the value of the weight coefficient set for the reference frame is made maximum. Thus, it is possible to obtain more natural motion blur in which the degree of blur increases as a distance from the dynamic body image of the reference frame increases.

By the way, a difference between the values of the weight coefficients in the weight coefficient set may be a factor that leaves a flicker component in the flicker-corrected video. Meanwhile, the appearance of motion blur varies depending on various conditions such as the size, color, and speed of the dynamic body image. For that reason, if attention is paid only to the appearance of motion blur and the values of the respective weight coefficients of the weight coefficient set are selected, in some cases, prominent flicker is likely to be left in a video where the flicker is corrected.

In this regard, the imaging apparatus 1 of this embodiment allows a user to select the best weight coefficient set in terms of both the appearance of motion blur and a flicker eliminating effect.

(Selection of Flicker Correction Mode (ACM TYPE))

FIG. 4 is a diagram showing the weight coefficient sets that are stored in the non-volatile memory 90 of the imaging apparatus 1.

In this example, a weight coefficient set can be selected according to three types of ACM TYPEs from "1" to "3".

It should be noted that, in FIG. 4, when a video signal of a frame with the value "0" of the weight coefficient is multiplied by "0", the frame consequently ceases to be a weighted addition target. The upper limit of the number of frames as weighted addition targets, M, is used in this sense.

In FIG. 4, the total of three types of weight coefficient sets can be selected according to the ACM TYPEs from "1" to "3" with respect to one combination of the power-supply frequency and the frame rate. However, more types of weight coefficient sets may be prepared.

It should be noted that the values of the respective weight coefficients of the weight coefficient set are determined for each combination of the power-supply frequency and the frame rate.

In each of the weight coefficient sets, the value of a weight coefficient allocated to the reference frame is set to be maximum. The values of weight coefficients of the (M−1) frames other than the reference frame are determined such that the value of a weight coefficient of a frame temporally far from the reference frame does not exceed the value of a weight coefficient of a frame temporally closer to the reference frame than the former frame. In other words, for a plurality of frames having different distances from a frame in a predetermined order among the (M−1) frames other than the frame in the predetermined order, the value of a weight coefficient set for a frame having a relatively long distance is set to be equal to or smaller than the value of a weight coefficient set for a frame having a relatively short distance. This can suppress the degree of influence on a flicker-corrected video from a dynamic body image component in the frame temporally farther from the reference frame and can provide motion blur with more natural appearance.

Further, in the plurality of types of weight coefficient sets selected according to the ACM TYPE, the values of the weight coefficients in the weight coefficient sets are set such that a weight coefficient set of the ACM TYPE "1" has the highest intensity of flicker correction, i.e., intensity of influence on the appearance of motion blur and such that the intensity becomes lower as the ACM TYPE changes to "2" and then to "3".

It should be noted that a single weight coefficient set selected according to the ACM TYPE may include the weight coefficients having the same value. When this weight coefficient set is selected, the flicker correction is performed by the typical second addition-type flicker correction method described above.

The user operates, for example, the operation input unit 80 provided to the imaging apparatus 1, and can thus select the power-supply frequency, the frame rate, and the ACM TYPE. FIG. 5 is a diagram showing an example of a flicker correction condition setting screen that is displayed on the finder 70, for example. This example shows a case where the power-supply frequency "60 Hz", the frame rate "400 fps", and the ACM TYPE "1" are set as flicker correction conditions.

The power-supply frequency, the frame rate, and the ACM TYPE that are selected by the user with the operation input unit 80 are given to the CPU 100. The CPU 100 refers to a weight coefficient set from the non-volatile memory 90, the weight coefficient set corresponding to the combination of the given power-supply frequency, frame rate, and ACM TYPE. The CPU 100 then sets, in the weighted addition circuit 323, the values of weight coefficients of the frames respectively ordered in the weight coefficient set. This allows the weighted addition circuit 323 to execute flicker correction using weighted addition of the set values of the weight coefficients with respect to the input video signals of the M sequential frames.

The user confirms the appearance of motion blur and the flicker eliminating effect in a flicker-corrected video obtained under the flicker correction conditions set by the user, for example, through a screen of a monitor or the like of a mainline output destination. Subsequently, the user operates the operation input unit 80 to set the next flicker correction conditions in which only the ACM TYPE is changed (e.g., the ACM TYPE is changed from "1" to "2"), and confirms a flicker-corrected video obtained by execution of the flicker correction under those flicker correction conditions. The user repeats the change of the ACM TYPE and the confirmation of the flicker-corrected video in this manner and determines an ACM TYPE with the best appearance of motion blur and the best degree of elimination of the flicker component.

In many operating environments for the imaging apparatus 1 where the power-supply frequency and the frame rate are determined, the user switches only the ACM TYPE and confirms a flicker-corrected video in each case, thus determining the best ACM TYPE.

In the plurality of types of weight coefficient sets selected according to the ACM TYPE, the values of the weight coefficients in the weight coefficient sets are set such that a weight coefficient set of the ACM TYPE "1" has the highest intensity of influence on the appearance of motion blur and such that the intensity becomes lower as the ACM TYPE changes to "2" and then to "3". In this regard, the user can select a weight coefficient set of the ACM TYPE "1" first, to confirm a flicker-corrected video in which the appearance of motion blur is largely changed, and then select the ACM TYPEs "2" and "3" in sequence to confirm a flicker-corrected video. This allows the user to confirm in sequence flicker-corrected videos in which the change in appearance of motion blur is suppressed in a stepwise manner, and makes it difficult to cause confusion when an optimal weight coefficient set is determined.

It should be noted that, here, the values of the weight coefficients in the weight coefficient sets are set such that the weight coefficient sets reduce the intensity of influence on the appearance of motion blur in order of the ACM TYPEs "1", "2", and "3". Conversely, the values of the weight coefficients in the weight coefficient sets may be set such that the weight coefficient sets increase the intensity of influence on the appearance of motion blur in order of the ACM TYPEs "1", "2", and "3".

In such a manner, according to the imaging apparatus 1 of this embodiment, the best weight coefficient set in terms of both the appearance of motion blur and the flicker eliminating effect can be easily set for the imaging apparatus 1.

Modified Example 1

Figure 6:
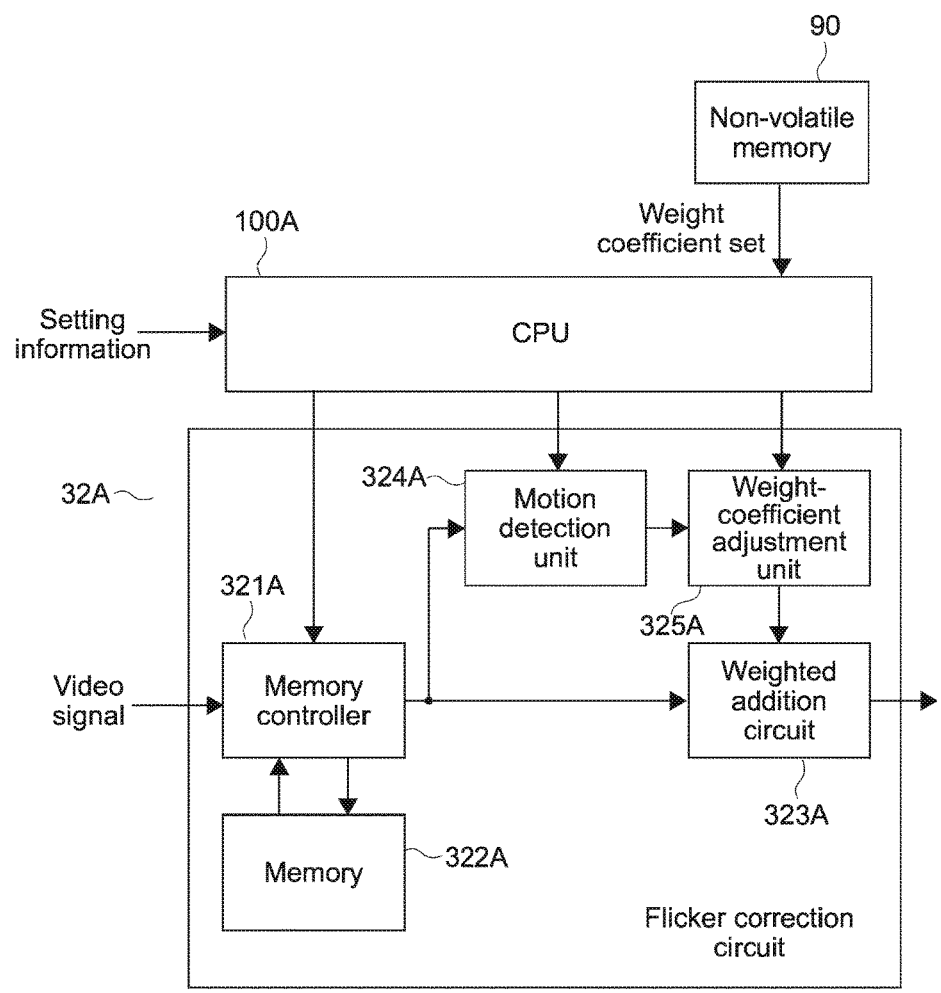
FIG. 6 is a block diagram showing a configuration of a modified example of a flicker correction circuit 32A in the imaging apparatus 1 of the first embodiment according to the present technology.

FIG. 6 is a block diagram showing a configuration of a modified example of a flicker correction circuit 32A in the imaging apparatus 1 of the first embodiment according to the present technology.

The flicker correction circuit 32A of this modified example includes the configuration of the flicker correction circuit 32 in the imaging apparatus 1 of the first embodiment, and additionally includes a motion detection circuit 324A and a weight-coefficient adjustment circuit 325A.

The motion detection circuit 324A detects a motion of a video among sequential frames that are flicker correction targets. The motion detection circuit 324A detects, for example, speed information such as an average speed or a top speed of the motion of the video among M frames that are weighted addition targets. For example, the motion detection circuit 324A supplies the detected speed information to the weight-coefficient adjustment circuit 325A.

The weight-coefficient adjustment circuit 325A adjusts the values of the respective weight coefficients, which are output from a CPU 100A so as to be set in a weighted addition circuit 323A, on the basis of the speed information from the motion detection circuit 324A, and then sets the resultant values in the weighted addition circuit 323A. For example, as a motion speed of a video becomes higher, the motion blur becomes larger. So, in order that the motion blur is prevented from being excessive, the weight-coefficient adjustment circuit 325A reduces the number of frames as weighted addition targets, M, or adjusts a balance among the values of the respective weight coefficients in the weight coefficient set.

For example, as shown in FIG. 3, during the flicker correction using weighted addition with the weight coefficients "4", "3", "2", and "1" from the reference frame side, when the value of a speed detected by the motion detection circuit 324A exceeds a first threshold, the weight-coefficient adjustment circuit 325A adjusts the values of the respective weight coefficients in the weight coefficient set in the following manner, for example.

Figure 7A:
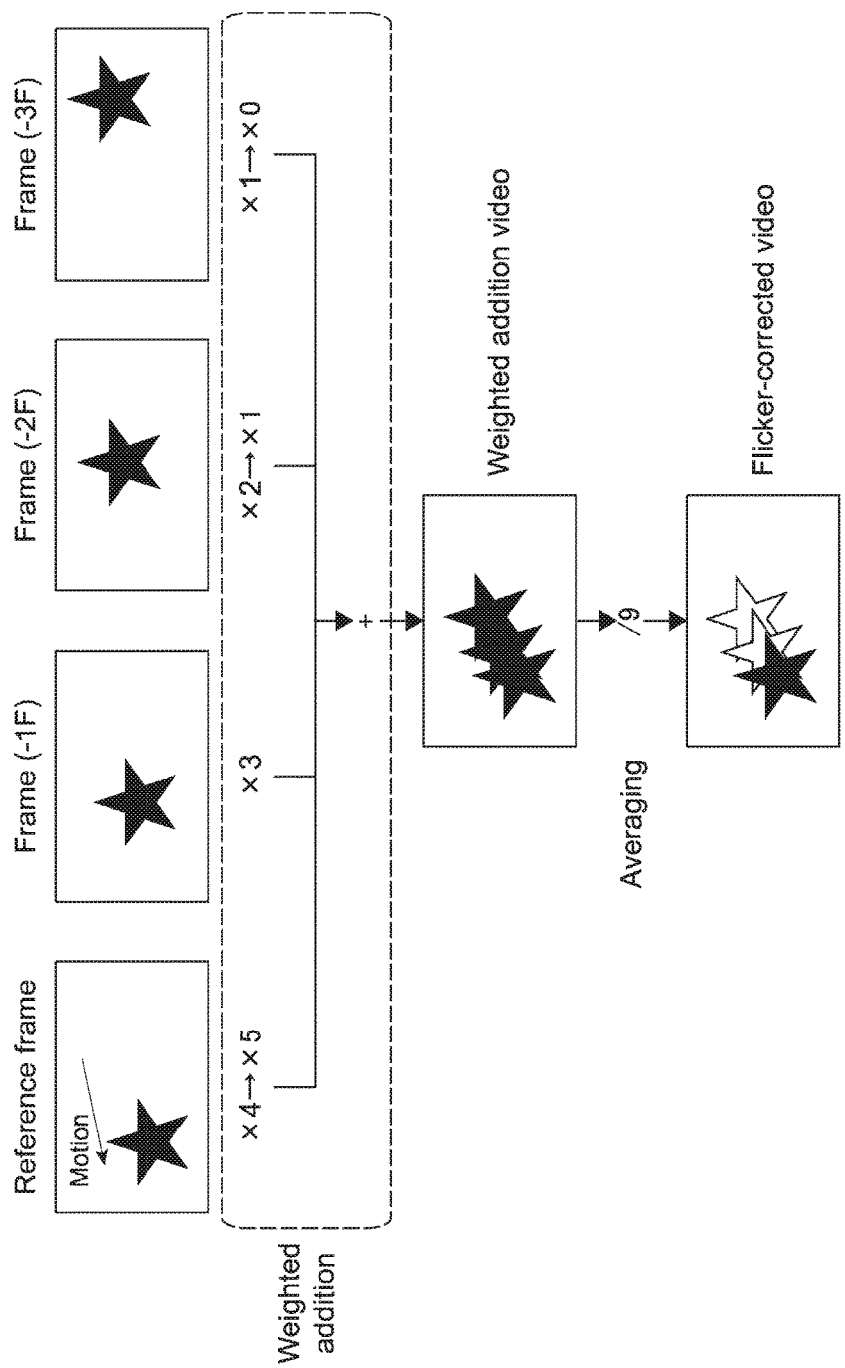
FIG. 7A is a diagram showing an example of weight coefficient adjustment according to the modified example of FIG. 6.
Figure 7B:
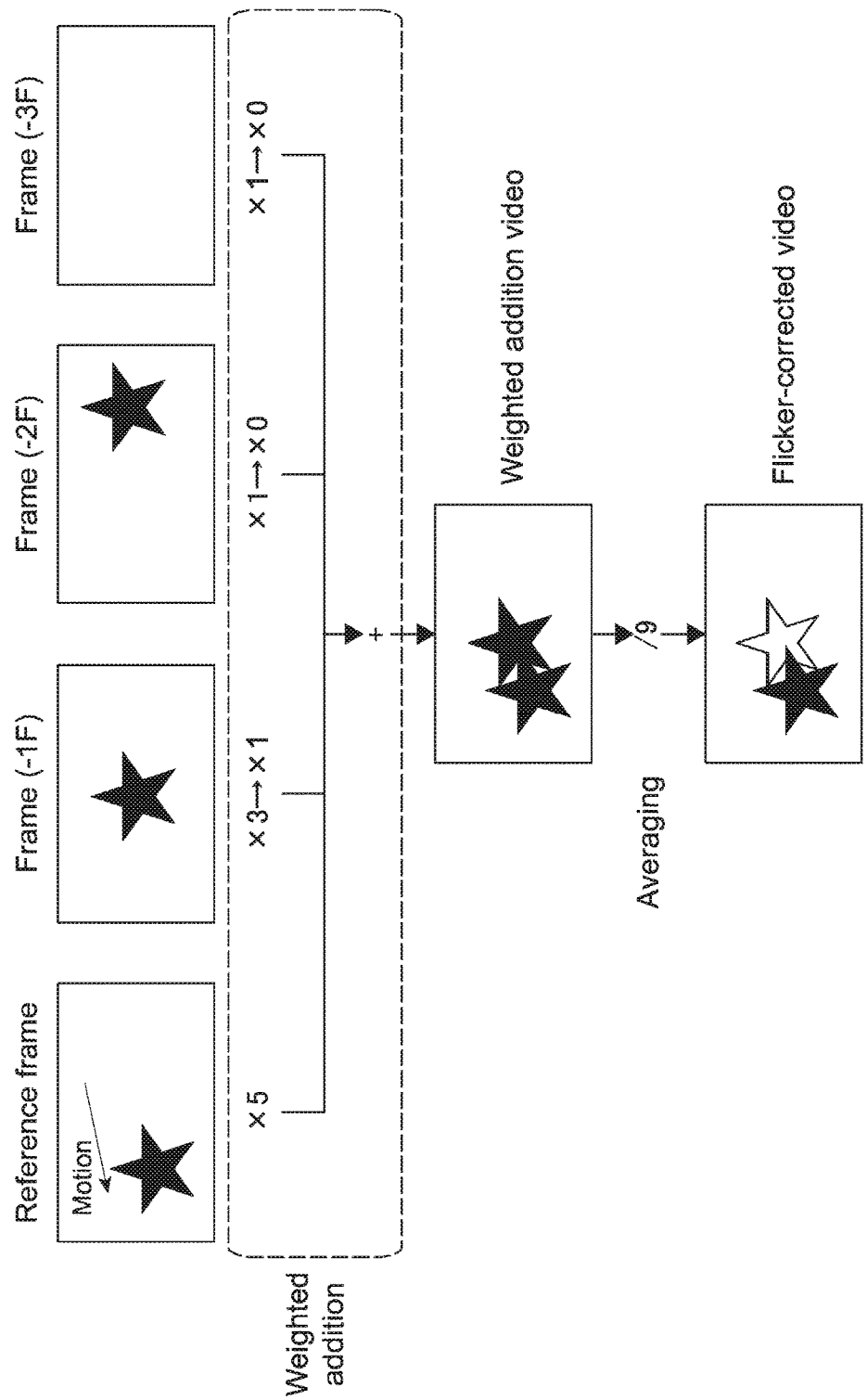
FIG. 7B is a diagram showing another example of the weight coefficient adjustment according to the modified example of FIG. 6.

FIGS. 7A and 7B are diagrams each showing an example of weight coefficient adjustment according to this modified example.

As shown in FIG. 7A, the weight-coefficient adjustment circuit 325A sets "0" for the value of a weight coefficient of a frame temporally farthest from the reference frame, to decrement the number of frames as weighted addition targets M by one. Further, the weight-coefficient adjustment circuit 325A increases the gap between the values of the weight coefficients "4", "3", and "2" of the remaining three frames. For example, "5", "3", and "1" are set.

Further, during the flicker correction using weighted addition with the weight coefficients "5", "3", and "1" from the reference frame side, when the value of a speed detected by the motion detection circuit 324A exceeds a second threshold (second threshold>first threshold), as shown in FIG. 7B, for example, the weight-coefficient adjustment circuit 325A further decrements the number of frames as weighted addition targets M by one. Further, the weight-coefficient adjustment circuit 325A adjusts the values of the weight coefficients "5" and "3" of the remaining two frames to, for example, "5" and "1". In such a manner, the number of frames that are weighted addition targets is adaptively changed for the speed of a motion of a video, or a balance among the values of the respective weight coefficients in the weight coefficient set is adjusted, so that the motion blur can be prevented from being excessive, and the appearance of motion blur can be made natural.

The function of adjusting the values of the weight coefficients on the basis of a result of the motion detection described above may be turned ON/OFF through the selection of the user.

Modified Example 2

In the embodiment described above, for example, among the M frames sequentially supplied to the flicker correction circuit 32, a frame supplied last is set as a reference frame, and weighted addition of a video signal of the reference frame and video signals of the (M−1) sequential frames supplied prior to the reference frame is used, thus performing the flicker correction.

The present technology is not limited to the above. For example, among the M frames sequentially supplied to the flicker correction circuit 32, a frame supplied first may be set as a reference frame, and weighted addition of a video signal of the reference frame and video signals of the (M−1) sequential frames supplied subsequently to the reference frame may be used, thus performing the flicker correction.

Furthermore, for example, among the M frames sequentially supplied to the flicker correction circuit 32, a frame supplied N-th (where 1<N<M) from the beginning may be set as a reference frame, and weighted addition of a video signal of the reference frame, video signals of (M−N) sequential frames supplied subsequently to the reference frame, and video signals of (N−1) sequential frames supplied prior to the reference frame may be used, thus performing the flicker correction.

Hereinabove, the embodiment in which the present technology is used for the flicker correction has been described, but the present technology can be similarly applied to luminance correction processing for general videos having a temporal change in luminance.

The videos having a temporal change in luminance include, other than a video with the above-mentioned flicker due to the influence of a light-source frequency, a time-lapse or hyper-lapse video in which a plurality of still images with shifted imaging times are continuously reproduced in a time sequence, a video with a flash band in which luminance increases at the moment at which a flash is used, and a video in which camera-shake is corrected. The present technology is applied to processing of correcting the influence of a luminance change in those various types of videos, so that a corrected video in which the appearance of motion blur is natural and a luminance change is not prominent can be obtained.

The present technology is not limited to be implemented in a single imaging apparatus and may also be implemented as a system including an imaging apparatus and a computer that controls the imaging apparatus.

It should be noted that the present technology can have the following configurations.

(1) A video signal processing apparatus, including
a luminance correction circuit that multiplies video signals of M sequential frames by weight coefficients individually set for frames respectively ordered in the M frames, M being plural, and adds and averages results, to generate a correction video signal of a frame in a predetermined order in the M frames, a value of a weight coefficient set for the frame in the predetermined order being maximum among values of the weight coefficients individually set for the frames respectively ordered in the M frames.

(2) The video signal processing apparatus according to (1), in which
for a plurality of frames having different distances from the frame in the predetermined order among the (M−1) frames other than the frame in the predetermined order, a value of a weight coefficient set for a frame having the distance relatively long is set to be equal to or smaller than a value of a weight coefficient set for a frame having the distance relatively short.

(3) The video signal processing apparatus according to (1) or (2), in which
the M is a value preset by dividing a frame rate by a light-source frequency of an imaging environment, rounding a resultant value, and setting a resultant integer as an upper limit.

(4) The video signal processing apparatus according to any one of (1) to (3), further including:
a memory that stores a plurality of types of weight coefficient sets, each of the weight coefficient sets including values of M weight coefficients individually associated with the frames respectively ordered in the M frames;
an operation input unit that receives, from a user, a selection of one weight coefficient set from the plurality of types of weight coefficient sets stored in the memory; and
a control unit that sets, in the luminance correction circuit, the values of the M weight coefficients of the weight coefficient set selected by the user with the operation input unit.

(5) The video signal processing apparatus according to (4), further including
a display data generation unit that generates display data for causing a screen of a display unit to regularly display pieces of specifying information in descending order or ascending order of correction intensity, the pieces of specifying information specifying the plurality of types of weight coefficient sets stored in the memory.

(6) The video signal processing apparatus according to any one of (1) to (5), further including:
a motion detection circuit that detects a motion of a video signal as a correction target; and
a weight-coefficient adjustment circuit that adjusts the values of the weight coefficients individually set for the frames respectively ordered, on the basis of speed information of the detected motion.

REFERENCE SIGNS LIST

1 imaging apparatus
10 lens unit
20 imaging unit
30 signal correction circuit
31 defect correction circuit
32 flicker correction circuit
40 knee/gamma correction circuit
50 finder output generation unit
60 mainline signal processing unit
70 finder
80 operation input unit
90 non-volatile memory
100 CPU

The invention claimed is:
1. A video signal processing apparatus, comprising
processing circuitry configured to
multiply video signals of M sequential frames by weight coefficients individually set for frames respectively ordered in the M frames, M being plural, and average the videos signals of the M sequential frames that are multiplied by the weight coefficients, to generate a correction video signal of a first frame in a predetermined order in the M frames, a value of the weight coefficient set for the first frame in the predetermined order being maximum among values of the weight coefficients individually set for the frames respectively ordered in the M frames, a value of the weight coefficient set for at least one of (M−1) frames other than the first frame in the predetermined order being smaller than the value of the weight coefficient set for the first frame in the predetermined order, wherein the M is a value set by dividing a frame rate by a light-source frequency of an imaging environment, rounding the divided frame rate, and setting an integer of the rounded and divided frame rate as an upper limit.

2. The video signal processing apparatus according to claim 1, wherein for a plurality of the frames having different distances from the first frame in the predetermined order among the (M−1) frames other than the first frame in the predetermined order, a value of the weight coefficient set for a second frame having the distance relatively long is set to be equal to or smaller than a value of the weight coefficient set for a third frame having the distance relatively short.

3. The video signal processing apparatus according to claim 1, further comprising:

a memory configured to store a plurality of types of weight coefficient sets, each of the weight coefficient sets including values of M weight coefficients individually associated with the frames respectively ordered in the M frames wherein the processing circuitry is configured to
receive, from a user, a selection of one weight coefficient set from the plurality of types of weight coefficient sets stored in the memory; and
set the values of the M weight coefficients of the weight coefficient set selected by the user.

4. The video signal processing apparatus according to claim 3, wherein the processing circuitry is configured to generate display data for causing a screen of a display unit to regularly display pieces of specifying information in descending order or ascending order of correction intensity, the pieces of specifying information specifying the plurality of types of weight coefficient sets stored in the memory.

5. The video signal processing apparatus according to claim 4, wherein the processing circuitry is configured to
detect a motion of a video signal as a correction target; and
adjust the values of the weight coefficients individually set for the frames respectively ordered, on the basis of speed information of the detected motion.

6. A video signal processing method, comprising
multiplying video signals of M sequential frames by weight coefficients individually set for frames respectively ordered in the M frames, M being plural, and
averaging, by processing circuitry of a video signal processing apparatus, the video signals of the M sequential frames that are multiplied by the weight coefficients, to generate a correction video signal of a first frame in a predetermined order in the M frames, a value of the weight coefficient set for the first frame in the predetermined order being maximum among values of the weight coefficients individually set for the frames respectively ordered in the M frames, a value of the weight coefficient set for at least one of (M−1) frames other than the first frame in the predetermined order being smaller than the value of the weight coefficient set for the first frame in the predetermined order, wherein the M is a value set by dividing a frame rate by a light-source frequency of an imaging environment, rounding the divided frame rate, and setting an integer of the rounded and divided frame rate as an upper limit.

7. A non-transitory computer-readable medium storing a program which when executed by a computer causes the computer to perform a video signal processing method, the method comprising:

multiplying video signals of M sequential frames by weight coefficients individually set for frames respectively ordered in the M frames, M being plural, and
averaging the video signals of the M sequential frames that are multiplied by the weight coefficients, to generate a correction video signal of a first frame in a predetermined order in the M frames, a value of the weight coefficient set for the first frame in the predetermined order being set to be maximum among values of the weight coefficients individually set for the frames respectively ordered in the M frames, a value of the weight coefficient set for at least one of (M−1) frames other than the first frame in the predetermined order being smaller than the value of the weight coefficient set for the first frame in the predetermined order, wherein the M is a value set by dividing a frame rate by a light-source frequency of an imaging environment, rounding the divided frame rate, and setting an integer of the rounded and divided frame rate as an upper limit.

* * * * *